United States Patent
Chang

(10) Patent No.: US 10,576,981 B2
(45) Date of Patent: Mar. 3, 2020

(54) HAND OPERATED AUXILIARY DRIVE AND RETARD TORQUE CONTROL

(71) Applicant: HITACHI CONSTRUCTION MACHINERY CO., LTD., Tokyo (JP)

(72) Inventor: Yidan Chang, Guelph (CA)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 44 days.

(21) Appl. No.: 15/511,334

(22) PCT Filed: Sep. 17, 2015

(86) PCT No.: PCT/IB2015/001987
§ 371 (c)(1),
(2) Date: Mar. 15, 2017

(87) PCT Pub. No.: WO2016/042405
PCT Pub. Date: Mar. 24, 2016

(65) Prior Publication Data
US 2017/0282918 A1 Oct. 5, 2017

Related U.S. Application Data

(60) Provisional application No. 62/052,204, filed on Sep. 18, 2014.

(51) Int. Cl.
*B60W 10/06* (2006.01)
*B60W 30/16* (2012.01)
(Continued)

(52) U.S. Cl.
CPC .......... *B60W 30/162* (2013.01); *B60K 26/02* (2013.01); *B60W 10/06* (2013.01);
(Continued)

(58) Field of Classification Search
CPC .. B60W 30/162; B60W 10/06; B60W 10/184; B60W 30/18109;
(Continued)

(56) References Cited

U.S. PATENT DOCUMENTS 6,078,859 A * 6/2000 Jastrzebski .......... B60K 31/047
123/352
6,621,176 B1 9/2003 Nagasaka et al.
(Continued)

FOREIGN PATENT DOCUMENTS

CN 1452569 10/2003
DE 102008060869 6/2009
(Continued)

OTHER PUBLICATIONS

Fayazi et al., Power delivery co-ordination to meet driver's demand in a mild hybrid vehicle with automated manual transmission, 2008, IEEE, p. 327-332 (Year: 2008).*
(Continued)

*Primary Examiner* — Anne M Antonucci
(74) *Attorney, Agent, or Firm* — Tarolli, Sundheim, Covell & Tummino LLP

(57) ABSTRACT

A control system for an off-highway vehicle including a foot operated drive pedal, a foot operated retard pedal, and a hand operated auxiliary drive/retard control. The auxiliary drive/retard control is operable in a first state to signal a request for drive torque and a second state to signal a request for retard torque.

23 Claims, 4 Drawing Sheets

(51) Int. Cl.
*B60W 30/188* (2012.01)
*B60K 26/02* (2006.01)
*B60W 30/18* (2012.01)
*B60W 10/184* (2012.01)
*B60K 20/06* (2006.01)
*B60W 30/14* (2006.01)

(52) U.S. Cl.
CPC ........ *B60W 10/184* (2013.01); *B60W 30/188* (2013.01); *B60W 30/1886* (2013.01); *B60W 30/18109* (2013.01); *B60W 30/18181* (2013.01); *B60K 20/06* (2013.01); *B60K 2026/029* (2013.01); *B60W 30/14* (2013.01); *B60W 2540/10* (2013.01); *B60W 2540/12* (2013.01); *B60W 2550/22* (2013.01)

(58) Field of Classification Search
CPC ......... B60W 30/18181; B60W 30/188; B60W 30/1886; B60W 30/14; B60W 2540/10; B60W 2540/12; B60W 2550/22; B60K 26/02; B60K 20/06
See application file for complete search history.

(56) References Cited

U.S. PATENT DOCUMENTS

| 8,635,000 B1* | 1/2014 | Hendrickson | E02F 9/2083 |
| | | | 180/65.265 |
| 9,555,706 B1* | 1/2017 | Mitchell | B60K 28/165 |
| 2009/0303463 A1* | 12/2009 | Jarus | C08L 9/00 |
| | | | 356/51 |
| 2009/0326770 A1* | 12/2009 | O'Neil | B60T 7/12 |
| | | | 701/54 |
| 2010/0313693 A1* | 12/2010 | Crombez | G05G 1/34 |
| | | | 74/484 R |
| 2012/0130609 A1* | 5/2012 | Jess | B60W 10/06 |
| | | | 701/54 |
| 2013/0256052 A1* | 10/2013 | Kamisetty | B60W 10/103 |
| | | | 180/305 |
| 2013/0261909 A1* | 10/2013 | Kamisetty | B60W 10/10 |
| | | | 701/54 |
| 2015/0039206 A1* | 2/2015 | Storch | F02D 28/00 |
| | | | 701/103 |
| 2016/0023658 A1* | 1/2016 | Kelly | B60W 50/085 |
| | | | 701/94 |
| 2016/0250931 A1* | 9/2016 | Wolff | B60L 7/18 |
| | | | 701/70 |
| 2017/0088135 A1* | 3/2017 | Kelly | B60W 30/146 |

FOREIGN PATENT DOCUMENTS

| EP | 1288055 | 3/2003 |
| EP | 1975029 | 10/2008 |
| EP | 2551557 | 1/2013 |
| FR | 2845962 | 4/2004 |
| JP | 2001071780 A | 3/2001 |
| JP | 2013050205 A | 3/2013 |

OTHER PUBLICATIONS

PCT/IB2015/001987 International Search Report & Written Opinion, completed Feb. 24, 2016.

* cited by examiner

HAND OPERATED AUXILIARY DRIVE AND RETARD TORQUE CONTROL

RELATED APPLICATIONS

This application claims priority to U.S. Provisional Application No. 62/052,204, filed Sep. 18, 2014, the entirety of which is incorporated herein by reference.

CROSS REFERENCES TO RELATED APPLICATIONS

This application filed under 35 U.S.C. § 371 is a national phase application of International Application Serial Number PCT/IB2015/001987 filed Sep. 17, 2015, which claims priority to U.S. Provisional Patent Application Ser. No. 62/052,204, filed Sep. 18, 2014.

TECHNICAL FIELD

The present invention relates to off-highway machinery and, more particularly, to an auxiliary drive and retard control that can be manipulated by an operator's hands.

BACKGROUND OF THE INVENTION

In order to maintain a high level of efficiency at a worksite it is often desirable to operate an off-highway vehicle at the vehicle's maximum safe speed. The maximum safe speed at which an off-highway vehicle can be operated is dependent on many variables including, but not limited to, load and road conditions. To maintain the off-highway vehicle at or near the maximum safe speed an operator must continuously control the throttle and brake via conventional foot operated pedals. Operators of off-highway vehicles often work long shifts, and continuous throttle and brake control throughout the course of the shift can lead to undesirable driver fatigue.

Currently, an off-highway vehicle may be equipped with a conventional cruise control system that may be used to maintain a speed set by the operator. However, under certain conditions, this set speed may not be achievable. For example, when a fully loaded off-highway vehicle ascends a 25% gradient hill, the vehicle nay be unable to attain 20% of its rated maximum speed. As a further example, when a fully loaded off-highway vehicle descends a 25% gradient hill, setting the vehicle speed at 50% of the maximum rated speed may create a situation where the brakes will be unable to maintain the set speed.

Additionally, there exists a conventional retard lever which may be manipulated by the hands of an operator. However, the conventional retard lever only provides vehicle descent speed control. Therefore, an operator must still manipulate the conventional foot operated throttle when encountering a flat road or ascending a hill.

SUMMARY

One aspect of the present disclosure is a control system for an off-highway vehicle having a foot operated drive pedal, a foot operated retard pedal, and a hand operated auxiliary drive/retard control. The auxiliary drive/retard control is operable in a first state to signal a request for drive torque and a second state to signal a request for retard torque. The hand operated auxiliary drive/retard control can be a lever, a joystick, a rotary knob, programmable pushbuttons, and/or a touchscreen. Drive/retard request signals from the foot operated drive pedal and/or the foot operated retard pedal override torque/retard request signals from the hand operated auxiliary drive/retard control. The drive torque and retard torque requests can be step increased and/or step decreased by the hand operated auxiliary drive/retard control. In a preferred embodiment, the torque/retard request from the foot operated pedals overrides a torque/retard request from the hand operated auxiliary drive/retard control. In another preferred embodiment, a predetermined default drive torque or retard torque request can be step increased or step decreased by the hand operated auxiliary drive/retard control.

Another aspect of the present disclosure is a method of controlling an engine and brakes of an off-highway vehicle. The method includes the steps of providing a foot operated drive pedal, a foot operated retard pedal, and a hand operated auxiliary drive/retard control. The auxiliary drive/retard control is operated to request drive or retard torque. It is determined if one of the foot operated pedals is requested drive torque or retard torque. The auxiliary drive/retard control drive or retard torque request is compared to the foot operated pedal drive or retard torque request. The auxiliary drive/retard control drive torque or retard torque request is sent if it is greater than the respective foot operated pedal drive torque or retard torque request. In a preferred embodiment, the method further includes the step of sending the foot operated pedal drive torque or retard torque request if the auxiliary drive/retard control drive torque or retard torque request is less than the foot operated pedal drive torque or retard torque request. In another preferred embodiment, the method further includes the step of determining if the foot operated pedals are requesting drive torque or retard torque and canceling to retard torque or drive torque request of the auxiliary drive/retard control. In yet another preferred embodiment, the method further includes the step of determining it the auxiliary drive/retard control has a requested a drive or retard torque step increase or step increase and sending a step increase or step increase drive torque or retard torque request.

Another aspect of the disclosure is a control system for an off-highway vehicle having a foot operated drive pedal, a foot operated retard pedal, and a hand operated auxiliary drive/retard lever. The lever is movable to a first position to signal a request for drive torque and a second position to signal a request for retard torque. In a preferred embodiment, the lever extends along a longitudinal axis and at least a part of the lever is rotatable about the longitudinal axis to step increase or step decrease the drive torque request or the retard torque request.

BRIEF DESCRIPTION OF THE DRAWINGS

The foregoing and other features and advantages of the present disclosure will become apparent to one skilled in the art to which the present disclosure relates upon consideration of the following description of the invention with reference to the accompanying drawings, wherein like reference numerals, unless otherwise described refer to like parts throughout the drawings and in which.

DETAILED DESCRIPTION

Figure 2:
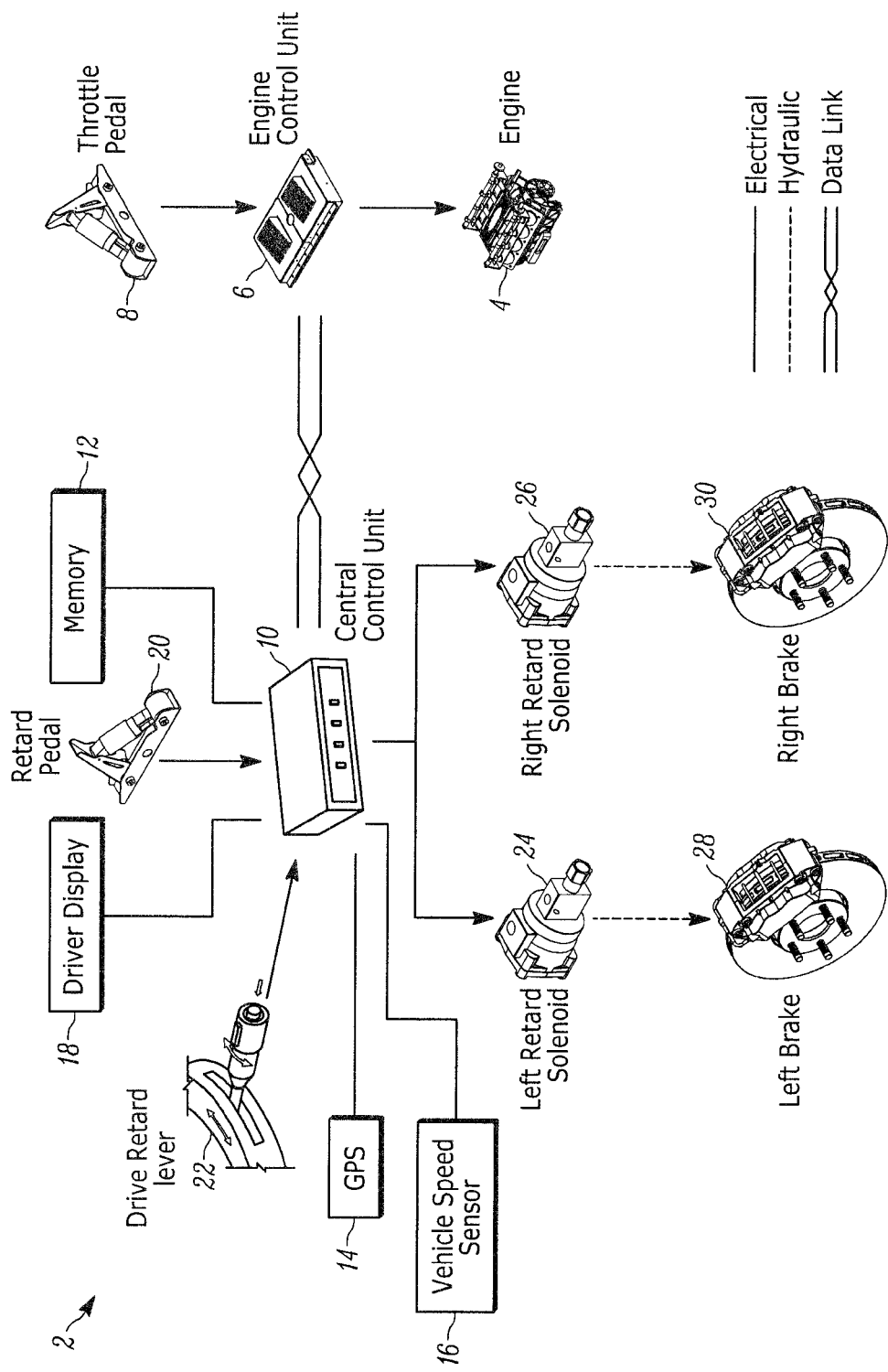
FIG. 2 is a basic block diagram showing the interconnection between the various components of the auxiliary drive and retard control system shown in FIG. 1.

With attention directed to FIG. 2, an off-highway vehicle system 2 is shown. The system 2 has an engine 4 controlled by an engine control unit 6. The engine control unit 6 receives input from a drive pedal 8 and communicates directly with a central control unit 10. As used in this document, "drive" means accelerator or throttle. The central control unit 10 communicates directly with a memory bank 12, a vehicle speed sensor 16, and a driver display 18. The central control unit 10 also receives input from a retard pedal 20 and an auxiliary drive/retard control 22. As used in this application, "retard" means brake. The central control unit 10 can actuate the left and right brakes 28, 30. In one disclosed embodiment the left and right brakes 28, 30 are actuated by left and right retard solenoids 24, 26, respectively. However, it is understood that the brakes 28, 30 can be actuated by any other suitable mechanism/system. The left and right retard solenoids 24, 26 can be controlled by pulse width modulation. As is known in the art, the duty cycle of an associated solenoid can be controlled in order to apply a desired fluid pressure to the associated brake that is related or proportional to the duty cycle parameters. Although standard disc brakes are illustrated in FIG. 2, it is understood that an off-highway vehicle would employ a wet braking system (or any other suitable braking system) as is known in the off-highway vehicle technical field.

Figure 1:
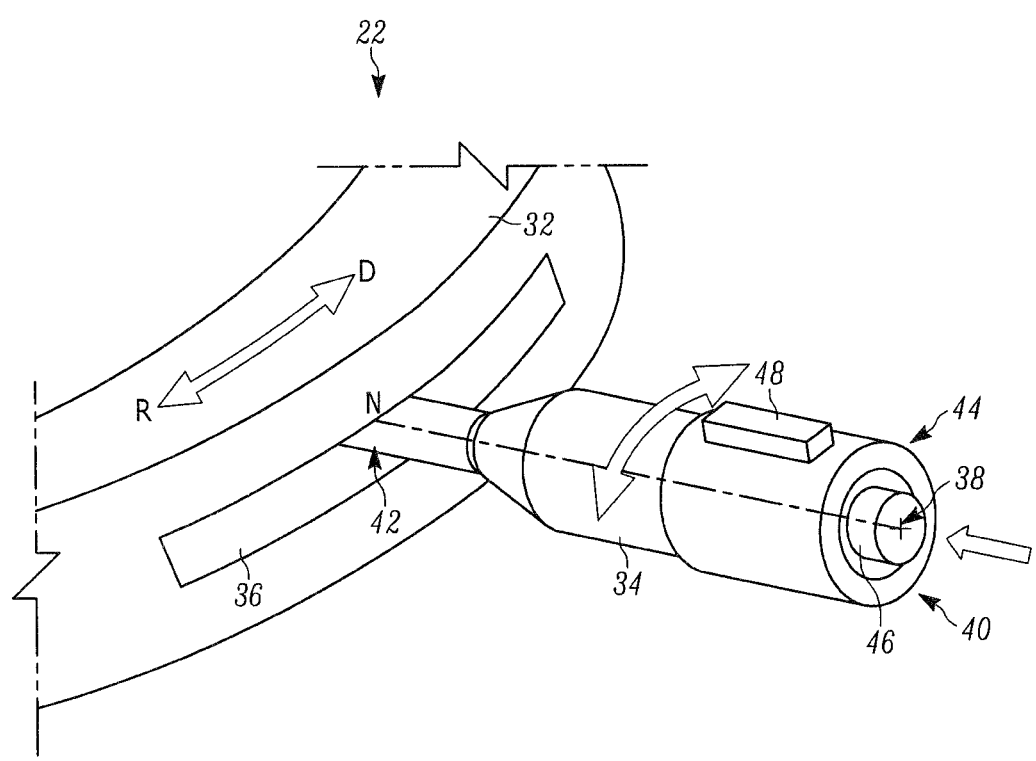
FIG. 1 illustrates a drive/retard control constructed in accordance with a preferred embodiment of the invention.

With attention directed to FIG. 1, one embodiment of an auxiliary drive/retard 22 control is shown. The auxiliary drive/retard control 22 illustrated in FIG. 1 is a control lever. However, it will be appreciated that the auxiliary drive/retard control 22 may be any other suitable operator interface such as, but not limited to, joysticks, rotary knobs, programmable push-buttons, touchscreens, etc. The control lever 22 has a base portion 32 and a stalk portion 34. The base portion 32 is provided with a slot 36. The stalk portion 34 extends along a central axis 38 between a proximal end 40 and a distal end 42. The distal end 42 is pivotally mounted within the base portion 32 such that the stalk portion 34 extends through the slot 36. The proximal end 40 of the stalk portion 34 has a rotary switch 44 and a resume button 46. The rotary switch 44 is oriented such that the switch 44 rotates about the central axis 38 of the stalk portion 34. The rotary switch 44 may be provided with a raised portion 48 to facilitate rotation of the rotary switch 36 by an operator. The resume button 46 is oriented such that depression of the button 46 moves the button 46 along the central axis 38 of the stalk portion 34 toward the distal end 42. The stalk portion 34 is shown in FIG. 1 in a neutral position N. The stalk portion 34 may be moved out of the neutral N position by rotating the stalk portion 34 relative to the base portion 32 to a drive position D or a retard position R.

An operator may control an off-highway vehicle equipped with the system 2 shown in FIG. 2 in a conventional manner utilizing the drive pedal and retard pedal 8, 20. The driver display 18 may provide information relating to the operation of the off-highway vehicle such as payload, vehicle speed (provided by the vehicle speed sensor 16), brake 28, 30 temperature, and/or engine 4 temperature. The system 2 may be augmented with a GPS unit 14, which could assist in providing information about the vehicle speed as well as also providing information about the location of the vehicle in the worksite. As will be explained below, the operator may supplement control of the vehicle through manipulation of the auxiliary drive/retard control lever 22.

When the stalk portion 34 of the auxiliary drive/retard control lever 22 is moved from the neutral position to the drive position D, the central control unit 10 communicates with the engine control unit 6 to operate the engine 4 at a default percentage of the maximum drive torque. In the disclosed embodiment the default drive torque percentage is 15%, however other default percentages may be used. When the stalk portion 34 is in the drive position D, rotating the rotary switch 44 clockwise about the central axis 38 of the stalk portion 34 causes the engine control unit 6 to send a step output to increase the drive torque of the engine 4 by 5%. The rotary switch 44 can be used to increase the drive torque of the engine up to a maximum of 100% of the rated engine 4 torque. Additionally, when the stalk portion 34 is in the drive position D, the rotary switch 44 can be used to decrease the drive torque of the engine 4 down to a minimum of 0% by rotating the rotary switch 44 counterclockwise about the central axis 38 of the stalk portion 34. When the stalk portion 34 is moved away from drive position D to the neutral position N, the auxiliary drive/retard control lever 22 sends no signal to the central control unit 10 and the off-highway vehicle system 2 operates as a standard off-highway vehicle system that may be controlled by the drive and retard pedals 8, 20.

When the stalk portion 34 is moved from the neutral position N to the retard position R the central control unit 10 controls the left and right retard solenoids 24, 26 to operate the left and right brakes 28, 30 at a default percentage of the maximum retard torque. In the disclosed embodiment the default retard torque percentage is 20%. Therefore, as an example, if the left and right brakes 28, 30 utilize a hydraulic system that operates at 700 psi, setting the retard torque percentage to 20% will result in the central control unit 10 operating the left and right retard solenoids 24, 26 via pulse width modulation such that the left and right brakes 28, 30 receive 140 psi from the hydraulic system. It is understood that other default percentages for the default retard torque may be used. When the stalk portion 34 is in the retard position R, rotating the rotary switch 44 clockwise about the central axis 38 of the stalk portion 34 causes the central control unit 6 to send a step output to increase the retard torque by 5%. The rotary switch 44 can be used to increase the retard torque up to a maximum of 100% of the rated retard torque. Additionally, when the stalk portion 34 is in the retard position R, the rotary switch 44 can be used to decrease the retard torque down to a minimum of 0% by rotating the rotary switch 44 counterclockwise about the central axis 38 of the stalk portion 34. When the stalk portion 34 is moved away from the retard position D to the neutral position N the auxiliary drive/retard control lever 22 sends no signal to the central control unit 10, and the off-highway vehicle system operates as a standard off-highway vehicle system that may be controlled by the drive and retard pedals 8, 20.

Similar to conventional cruise control systems, input from the drive and retard pedals 8, 20 can override input set by the auxiliary drive/retard control lever 22. Therefore, for example, if the auxiliary drive/retard control lever 22 is set at 25% drive torque and an operator depresses the retard pedal 20, the system 2 may cancel the drive torque set by the auxiliary drive/retard control lever 22 and apply retard torque as requested by the retard pedal 20. The resume button 46 may be used to recall a previously set drive or retard torque. Continuing the above example, once the operator releases the retard pedal 20 and wishes to continue at the previously set drive torque, the operator may depress the resume button 46, which can cause the system 2 to revert back to the previously set 25% drive torque set by the auxiliary drive/retard control lever 22.

With attention directed to FIGS. 3A and 3B, operation of the drive/retard control system 2 will now be explained. At step 100 the central control unit 10 determines whether the auxiliary drive/retard control lever 22 is in the neutral position N, has been moved to the drive position D, or has been moved to the retard position R. If the central control unit 10 determines the auxiliary drive/retard control lever is in the neutral position N the system 2 proceeds to step 102 where the system 2 resets to minimum drive and retard torque values, and cancels any drive or retard request commands that may have previously been sent. The system 2 may then operate as a standard off-highway vehicle system controlled by the drive and retard foot pedals 8, 20. The system then proceeds to steps 104 and 106 where the system respectively ends control and resets back to step 100.

Figure 3A:
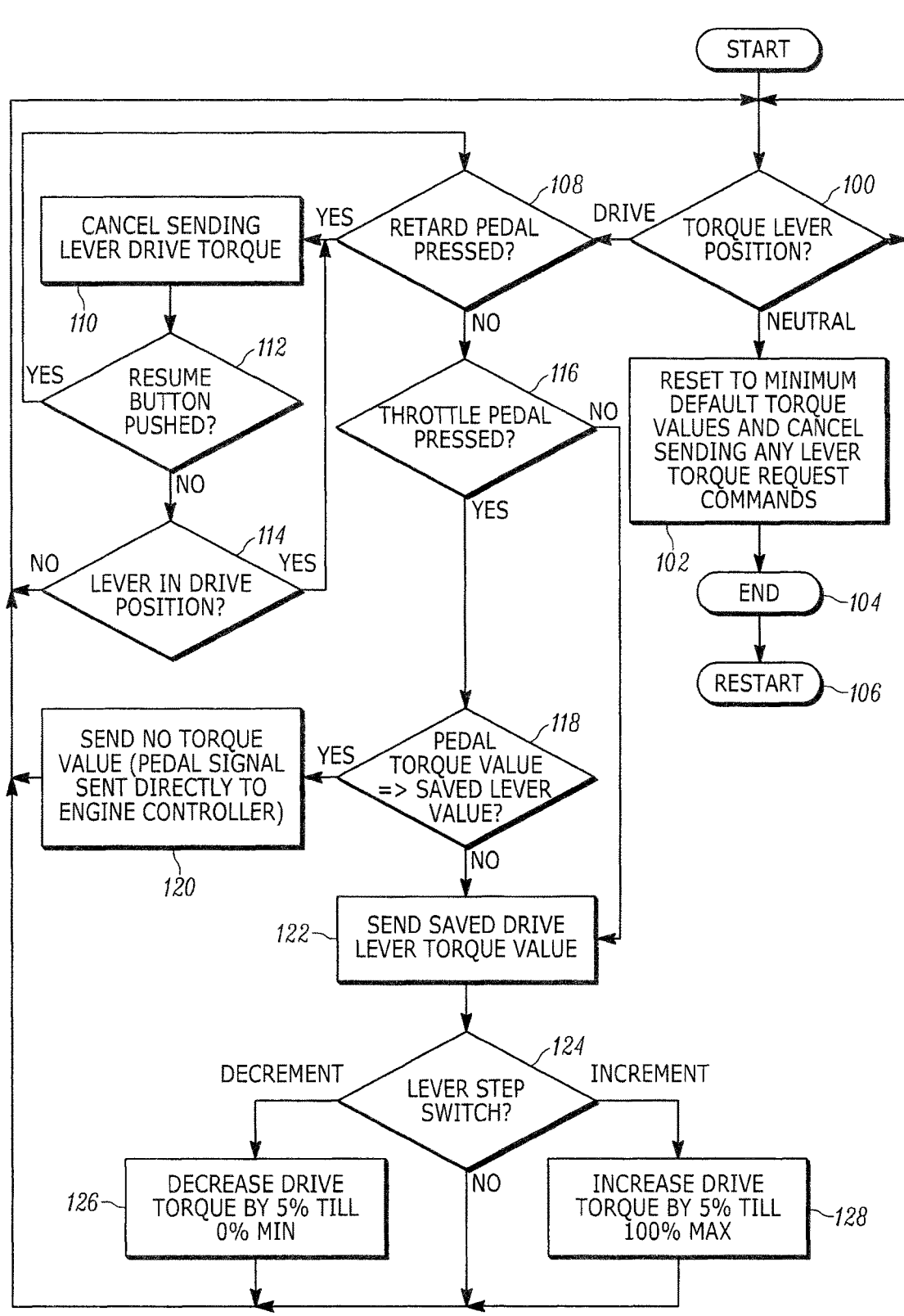
FIGS. 3A and 3B are a flow chart showing an operation of the drive and retard control system.

Referring to FIG. 3A, the drive control portion of the drive/retard control system 2 will first be discussed. At step 100, if the central control unit 10 determines the auxiliary drive/retard control lever 22 is in the drive position D, the system 2 proceeds to step 108 where the central control unit 10 determines whether the retard pedal 20 is depressed. If the retard pedal 20 is depressed the system 2 proceeds to step 110 and the central control unit 10 cancels the drive torque set by the auxiliary drive/retard control lever 22. Next, at step 112, the central control unit 10 determines whether the resume button 46 is depressed. If the resume button 46 is depressed the control system 2 returns to step 108. If the resume button 46 is not depressed the system 2 proceeds to step 114. At step 114 the central control unit 10 determines if the auxiliary drive/retard control lever 22 is still in the drive position D. If the lever 22 is no longer in the drive position D the control system 2 returns to step 108. If the lever 22 remains in the drive position D the control system returns to step 110. The determination made at step 114 is the last step in the instance where the auxiliary drive/retard control lever 22 is in the drive position D and the retard pedal 20 is depressed.

Returning back to step 108, if the auxiliary drive/retard control lever 22 is in the drive position D and the retard pedal 20 is not depressed the system 2 proceeds to step 116. At step 116 the central control unit 10 determines if the drive pedal 8 is depressed. If the drive pedal 8 is depressed the system 2 proceeds to step 118. At step 118 the central control unit 10 measures whether the torque request of the drive pedal 8 is greater than the torque request of the auxiliary drive/retard control lever 22. If the torque request of the drive pedal 8 is greater than the torque request of the control lever 22 the system proceeds to step 120, and the torque request of the drive pedal 8 overrides the torque request of the control lever 22. The system 2 then restarts at step 100. If the torque request of the drive pedal 8 is less than the torque request of the control lever 22 the system 2 proceeds to step 122. With attention momentarily directed back to step 116, if the central control unit 10 determines that the drive pedal 8 is not depressed the system 2 also proceeds to step 122. At step 122 the central control unit 10 communicates with the engine control unit 6 to operate the engine 4 at the default percentage of the maximum rated drive torque which, in the disclosed embodiment, is 15%.

After step 122 the system proceeds to step 124 where the central control unit 10 determines whether the rotary switch 44 has been rotated. If the rotary switch 44 has not been rotated the system 2 resets back to step 100. If the central control unit 10 determines that the rotary switch 44 has been rotated counterclockwise the system 2 proceeds to step 126 and the requested drive torque is decreased by 5%. The system then resets back to step 100. If the central control unit 10 determines that the rotary switch 44 has been rotated clockwise the system 2 proceeds to step 128 and the requested drive torque is increased by 5%. The system 2 then resets back to step 100. The discussion of step 128 completes the discussion of the drive control portion of the drive/retard control system 2.

Figure 3B:
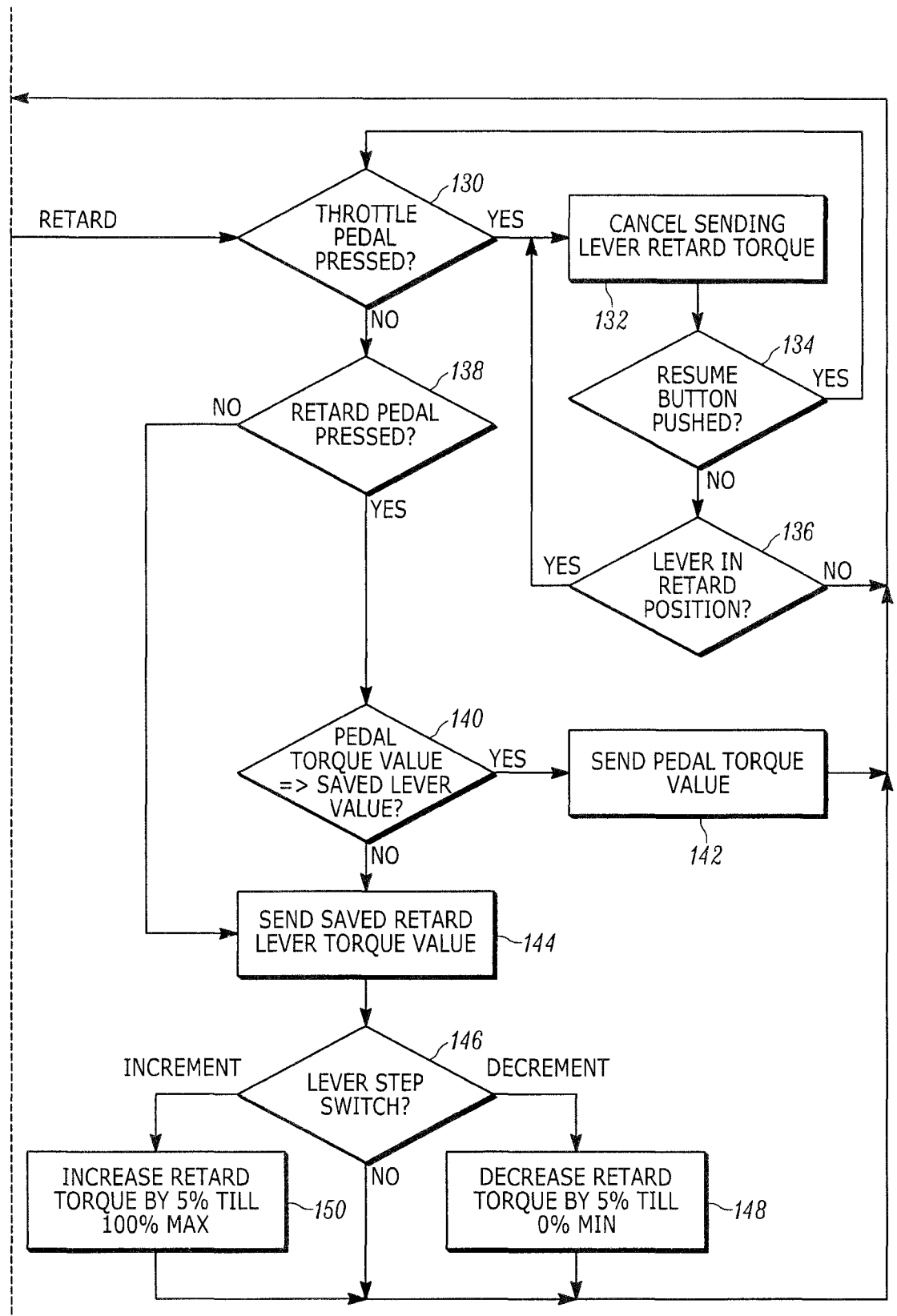

Referring to FIG. 3B, the retard control portion of the drive/retard control system 2 will now be discussed. Returning back to step 100, if the central control unit 10 determines the auxiliary drive/retard control lever 22 is in the retard position R the system 2 proceeds to step 130. At step 130 the central control unit 10 determines whether the drive pedal 8 is depressed. If the drive pedal 8 is depressed the system 2 proceeds to step 132, and the central control unit 10 cancels the retard torque set by the auxiliary drive/retard control lever 22. Next, at step 134 the central control unit 10 determines whether the resume button 46 is depressed. If the resume button 46 is depressed the system 2 returns to step 130. If the resume button 46 is not depressed the system 2 proceeds to step 136. At step 136 the central control unit 10 determines if the auxiliary drive/retard control lever 22 is still in the retard position R. If the lever 22 is no longer in the retard position R the system 2 returns to step 130. If the lever 22 remains in the retard position R the control system 2 returns to step 132. The determination made at step 136 is the last step in the instance where the auxiliary drive/retard control lever 22 is in the retard position R and the drive pedal 8 is depressed.

Returning back to step 130, if the auxiliary drive/retard control lever 22 is in the retard position R and the drive pedal 8 is not depressed the system proceeds to step 138. At step 138 the central control unit 10 determines if the retard pedal 20 is depressed. If the retard pedal 20 is depressed the system 2 proceeds to step 140. At step 140 the central control unit 10 measures whether the retard request of the retard pedal 20 is greater than the retard request of the auxiliary drive/retard control lever 22. If the retard request of the retard pedal 20 is greater than the retard request of the control lever 22 the system proceeds to step 142, and the retard torque request of the retard pedal 20 overrides the retard torque request of the control lever 22. The system then restarts at step 100. If the retard request of the retard pedal 20 is less than the retard request of the control lever 22 the system 2 proceeds to step 144. With attention momentarily directed back to step 138, if the central control unit 10 determines that the retard pedal 20 is not depressed the system 2 also proceeds to step 144. At step 144 the central control unit 10 controls the left and right retard solenoids 24, 26 to operate the left and right brakes 28, 30 at the default percentage of the maximum available retard torque which, in the disclosed embodiment, is 20%.

After step 144 the system 2 proceeds to step 146 where the central control unit 10 determines whether the rotary switch 44 has been rotated. If the rotary switch 44 has not been rotated the system 2 resets back to step 100. If the central control unit 10 determines that that the switch 44 has been rotated counterclockwise the system 2 proceeds to step 148 and the requested retard torque is decreased by 5%. The system 2 then resets back to step 100. If the central control unit 10 determines that the rotary switch 44 has been rotated clockwise the system 2 proceeds to step 150 and the requested retard torque is increased by 5%. The system 2 then resets back to step 100. The discussion of step 150 completes the discussion of the retard control portion of the drive/retard control system 2.

If an operator traverses the same stretch of road repeatedly throughout a shift it may be beneficial to allow an operator to store a predetermined sequence of requested drive and retard torques. The memory bank 12 of the off-highway vehicle system 2 may cooperate with the central control unit 10 to provide such a feature in the following manner. First, the operator inputs to the central control unit 10 that he or she wishes to begin recording a torque request sequence. The central control unit 10 communicates with the memory bank 12 to record the exact drive or retard torque requested until the operator inputs to the central control unit 10 to end recording of the torque request sequence. During future operation of the vehicle, the central control unit 10 may display a previously recorded torque request sequence on the driver display 18. The operator of the vehicle may choose to execute the previously recorded torque request sequence, at which point the central control unit 10 communicates with the memory bank 12 to carry out the desired torque request sequence.

What has been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the spirit and scope of the appended claims.

The invention claimed is:

1. A control system for an off-highway vehicle, comprising:
   a foot operated drive pedal;
   a foot operated retard pedal; and
   a hand operated auxiliary drive/retard control, the auxiliary drive/retard control being operable in a first state to signal a request for drive torque and a second state to signal a request for retard torque, the hand operated auxiliary drive/retard control requesting a predetermined default drive torque when the hand operated auxiliary drive/retard control is operated in the first state.

2. The control system of claim 1, wherein the hand operated auxiliary drive/retard control is at least one of a lever, a joystick, a rotary knob, programmable push-buttons, and a touchscreen.

3. The control system of claim 1, wherein drive/retard request signals from at least one of the foot operated drive pedal and the foot operated retard pedal override torque/retard request signals from the hand operated auxiliary drive/retard control.

4. The control system of claim 1 further comprising a memory bank that can record and recall a sequence of drive/retard request signals from at least one of the auxiliary drive/retard control, the foot operated drive pedal, and the foot operated retard pedal.

5. The control system of claim 1, wherein the hand operated auxiliary drive/retard control further comprises a resume function that can return at least one of the drive torque request and retard torque request to a level previously set by an operator.

6. The control system of claim 1, wherein the predetermined default drive torque request is 15% of a maximum available drive torque.

7. The control system of claim 6, wherein the predetermined default drive torque request can be step increased or step decreased by the hand operated auxiliary drive/retard control.

8. The control system of claim 1, wherein a predetermined default retard torque is requested when the hand operated auxiliary drive/retard control is operated in the second state.

9. The control system of claim 8, wherein the predetermined default retard torque request is 20% of a maximum available retard torque.

10. The control system of claim 9, wherein the predetermined default retard torque request can be step increased or step decreased by the hand operated auxiliary drive/retard control.

11. A method of controlling an engine and brakes of an off-highway vehicle comprising the steps of:
    providing a foot operated drive pedal, a foot operated retard pedal, and a hand operated auxiliary drive/retard control;
    operating the auxiliary drive/retard control to request drive torque, the drive torque request being a predetermined default drive torque;
    determining if the foot operated drive pedal is requesting drive torque;
    comparing the auxiliary drive/retard control drive torque request to the foot operated drive pedal drive torque request if it is determined that the foot operated drive pedal is requesting drive torque; and
    sending the auxiliary drive/retard control drive torque request if the auxiliary drive/retard control drive torque request is greater than the foot operated drive pedal drive torque request.

12. The method of controlling an engine and brakes of an off-highway vehicle according to claim 11, further comprising the step of sending the foot operated drive pedal torque request if the auxiliary drive/retard control drive torque request is less than the foot operated drive pedal drive torque request.

13. The method of controlling an engine and brakes of an off-highway vehicle according to claim 11, further comprising the steps of:
    determining if the foot operated retard pedal is requesting retard torque; and
    canceling the auxiliary drive/retard control drive torque request if it is determined that the foot operated retard pedal is requesting retard torque.

14. The method of controlling an engine and brakes of an off-highway vehicle according to claim 11, further comprising the steps of:
    determining if the auxiliary drive/retard control has requested a drive torque step increase or step decrease; and
    sending a step increase drive torque request if it is determined that the auxiliary drive/retard control has requested a drive torque step increase.

15. The method of claim 14, further comprising the step of sending a step decrease drive torque request if it is determined that the auxiliary drive/retard control requested a drive torque step decrease.

16. The method of claim 14, further comprising the step of sending a step decrease retard torque request if it is determined that the auxiliary drive/retard control requested a drive retard step decrease.

17. A method of controlling an engine and brakes of an off-highway vehicle comprising the steps of:
    providing a foot operated drive pedal, a foot operated retard pedal, and a hand operated auxiliary drive/retard control;
    operating the auxiliary drive/retard control to request retard torque, the retard torque request being a predetermined default retard torque;
    determining if the foot operated retard pedal is requesting retard torque;

comparing the auxiliary drive/retard control retard torque request to the foot operated retard pedal retard torque request if it is determined that the foot operated retard pedal is requesting retard torque; and sending the auxiliary drive/retard control retard torque request if the auxiliary drive/retard control retard torque request is greater than the foot operated drive pedal retard torque request.

18. The method of controlling an engine and brakes of an off-highway vehicle according to claim 17, further comprising the step of sending the foot operated retard pedal retard torque request if the auxiliary drive/retard control retard torque request is less than the foot operated retard pedal retard torque request.

19. The method of controlling an engine and brakes of an off-highway vehicle according to claim 17, further comprising the steps of:

determining if the foot operated drive pedal is requesting drive torque; and canceling the auxiliary drive/retard control retard torque request if it is determined that the foot operated drive pedal is requesting drive torque.

20. The method of controlling an engine and brakes of an off-highway vehicle according to claim 17, further comprising the steps of:

determining if the auxiliary drive/retard control has requested a retard torque step increase or step decrease; and sending a step increase retard torque request if it is determined that the auxiliary drive/retard control has requested a retard torque step increase.

21. A control system for an off-highway vehicle, comprising:

a foot operated drive pedal;

a foot operated retard pedal;

a hand operated auxiliary drive/retard lever, the lever being movable to a first position to signal a request for drive torque and a second position to signal a request for retard torque, the hand operated auxiliary drive/retard lever requesting a predetermined default drive torque when the hand operated auxiliary drive/retard lever is operated in the first state, the lever having a resume function that can return at least one of the drive torque request and retard request to a level previously set by an operator;

a memory bank for recording and recalling a sequence of drive/retard request signals from at least one of the lever, the foot operated drive pedal, and the foot operated retard pedal;

wherein a predetermined default drive torque is requested when the lever is moved to the first position and a predetermined default retard torque is requested when the lever is moved to the second position.

22. The control system of claim 21, wherein the lever extends along a longitudinal axis and at least a part of the lever is rotatable about the longitudinal axis to step increase or step decrease the drive torque request or the retard torque request.

23. A control system for an off-highway vehicle, comprising:

a foot operated drive pedal;

a foot operated retard pedal; and a hand operated auxiliary drive/retard lever, the lever being movable to a first position to signal a request for drive torque and a second position to signal a request for retard torque, the hand operated auxiliary drive/retard lever requesting a predetermined default drive torque when the hand operated auxiliary drive/retard lever is operated in the first state.

* * * * *